US008694213B2

(12) United States Patent
Nishitani et al.

(10) Patent No.: US 8,694,213 B2
(45) Date of Patent: Apr. 8, 2014

(54) CONSTRUCTION MACHINE WITH HYBRID DRIVE UNIT, REGENERATIVE DEVICE EQUIPPED IN CONSTRUCTION MACHINE, AND REGENERATIVE METHOD

(71) Applicant: Toshiba Kikai Kabushiki Kaisha, Tokyo (JP)

(72) Inventors: Keisuke Nishitani, Zama (JP); Masahiro Nishiyama, Zama (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/771,987

(22) Filed: Feb. 20, 2013

(65) Prior Publication Data

US 2013/0218422 A1 Aug. 22, 2013

(30) Foreign Application Priority Data

Feb. 21, 2012 (JP) ................................. 2012-035687

(51) Int. Cl.
*G06F 17/00* (2006.01)
(52) U.S. Cl.
USPC ................ 701/50; 701/36; 180/326; 180/330
(58) Field of Classification Search
USPC .............. 701/36, 50; 180/326, 330, 332, 333; 172/2, 3
See application file for complete search history.

(56) References Cited

U.S. PATENT DOCUMENTS 7,293,625 B2 * 11/2007 Kumazawa ................... 180/333

FOREIGN PATENT DOCUMENTS

| JP | 4024120 | 10/2007 |
| JP | 2008-291522 | 12/2008 |
| JP | 4732284 | 4/2011 |

OTHER PUBLICATIONS

English Language Abstract of JP 2008-291522 published on Dec. 4, 2008.
English Language Translation of JP 2008-291522 published on Dec. 4, 2008.
English Language Abstract of JP 4732284 issued Apr. 28, 2011.
English Language Translation of JP 4732284 issued Apr. 28, 2011.
English Language Abstract of JP 4024120 issued Dec. 19, 2007.
English Language Translation of JP 4024120 issued Dec. 19, 2007.

* cited by examiner

*Primary Examiner* — Richard Camby
(74) *Attorney, Agent, or Firm* — DLA Piper LLP (US)

(57) ABSTRACT

Provided is a method of controlling the regenerating condition by use of a construction machine having an upper revolving structure with a hybrid drive unit, and a lower traveling body, wherein when in a brake mode, the hydraulic motor is neutralized by the internal communication of an inlet port and an outlet port of the hydraulic motor via a communication valve, such that most of the kinetic (inertia) energy is efficiently transduced into electric energy by way of regenerative power generation for electric storage, and such that the switchover between driving and regenerative power generation is rendered in the optimal condition. The control unit determines the control mode of the control unit in accordance with the rotation direction of the hydraulic actuator, the operating direction of the hydraulic actuator controller, the actual rotational velocity of the hydraulic actuator, and the manipulated variable of the hydraulic actuator controller.

5 Claims, 6 Drawing Sheets

|  | Revolution Direction | Lever Operation Direction | \|Target Revolution Velocity\| − \|Actual Revolution Velocity\| | Mode |
|---|---|---|---|---|
| 1 | Clockwise | Right | + | Drive |
| 2 | Clockwise | Right | − | Regeneration |
| 3 | Clockwise | Right | 0 | 0 |
| 4 | Clockwise | Left | + | Regeneration |
| 5 | Clockwise | Left | − | Regeneration |
| 6 | Clockwise | Left | 0 | Regeneration |
| 7 | Clockwise | Neutral | + | Error |
| 8 | Clockwise | Neutral | − | Regeneration |
| 9 | Clockwise | Neutral | 0 | Error |
| 10 | Counterclockwise | Right | + | Regeneration |
| 11 | Counterclockwise | Right | − | Regeneration |
| 12 | Counterclockwise | Right | 0 | Regeneration |
| 13 | Counterclockwise | Left | + | Drive |
| 14 | Counterclockwise | Left | − | Regeneration |
| 15 | Counterclockwise | Left | 0 | 0 |
| 16 | Counterclockwise | Neutral | + | Error |
| 17 | Counterclockwise | Neutral | − | Regeneration |
| 18 | Counterclockwise | Neutral | 0 | Error |
| 19 | Stop | Right | + | Drive |
| 20 | Stop | Right | − | Error |
| 21 | Stop | Right | 0 | Error |
| 22 | Stop | Left | + | Drive |
| 23 | Stop | Left | − | Error |
| 24 | Stop | Left | 0 | Error |
| 25 | Stop | Neutral | + | Error |
| 26 | Stop | Neutral | − | Error |
| 27 | Stop | Neutral | 0 | 0 |

CONSTRUCTION MACHINE WITH HYBRID DRIVE UNIT, REGENERATIVE DEVICE EQUIPPED IN CONSTRUCTION MACHINE, AND REGENERATIVE METHOD

TECHNICAL FIELD

The present invention is directed to a construction machine with a hybrid drive unit for driving a upper revolving structure of a construction machine device such as a hydraulic excavator, to a regenerative device equipped in the construction machine, and to a regenerative method, wherein the construction machine is controlled by way of the coordination of a hydraulic motor and a power-generation/electric motor, and wherein upon activation and revolving motion of the upper revolving structure, when in a brake mode, the hydraulic motor is neutralized by the internal communication of an inlet port and an outlet port of the hydraulic motor via a communication valve, such that most of the kinetic (inertia) energy is efficiently transduced into electric energy by way of regenerative power generation for electric storage, and such that the switchover between driving and regenerative power generation is rendered in the optimal condition.

BACKGROUND ART

Recently, in the field of the construction machine such as a hydraulic excavator, as a remedy for situations that aggravate the working environment such as exhaust gas and noises, a variety of hybrid drive units have been proposed, in particular, an energy regenerative device for a construction machine that enables efficient energy recovery which is the advantage of a hybrid system.

The Applicant proposed in the Patent Document 1 the art relative to a construction machine with a hybrid drive unit, wherein the inertia energy of a comparatively large inertia object such as a boom of a hydraulic excavator and a upper revolving structure is effectively regenerated, and wherein there is no need for supplementary recharging to an electric storage device for an electric motor/power generator.

Figure 3:
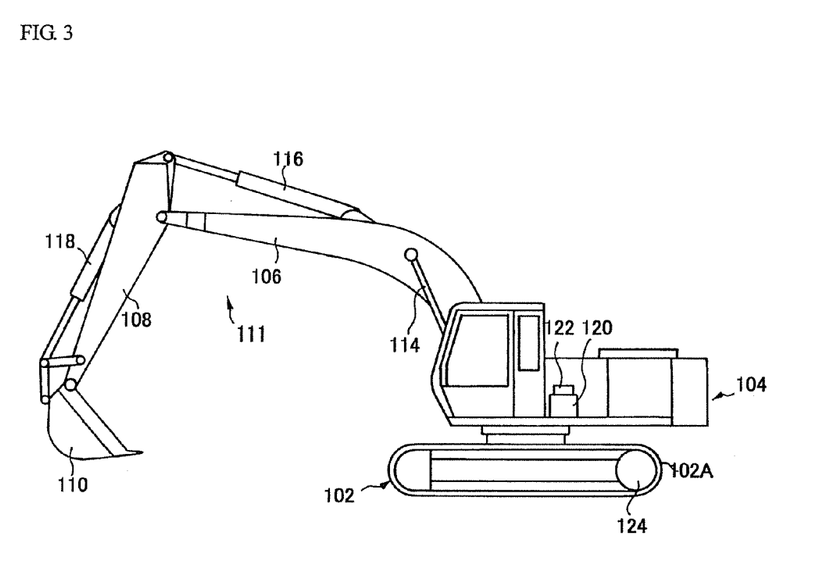
FIG. 3 is an overview diagram of the hydraulic excavator which is a conventional construction machine.

FIG. 3 is an overview diagram of the conventional hydraulic excavator. As illustrated, the hydraulic excavator comprises: a lower traveling body 102 having a right/left endless track caterpillar band 102A as a travelling means; a upper revolving structure 104 revolvably mounted on the lower traveling body 102; a multijoint hydraulic operating machine (front device) 111 that is elevatably connected to the upper revolving structure 104 and that consists of a boom 106, an arm 108 and a bucket 110; a hydraulic cylinder 114 for a boom that drives the boom 106; a hydraulic cylinder 116 for an arm that drives the arm 108; a hydraulic cylinder 118 for a bucket that drives the bucket 110; a revolution hydraulic motor 120 and a velocity reducer 122 that drive the upper revolving structure 104; and hydraulic motors 124L, 124R for right/left travelling that drive the right/left endless track caterpillar band 102A.

A method to employ a regenerative device to this kind of construction machine is described in the Patent Document 1: "When the operator returns the lever of the control valve in order to stop the upper structure, the control unit detects the change of the signal generated from the hydraulic/electric transducer, and a control signal generated in accordance with the data processing program of the control unit is transmitted to the servo driver. In response to this, the servo driver controls the electrical quantity to be supplied to the electric motor, actuates the regenerative mode, and transmits a control signal to the electrical/hydraulic transducing valve. This control signal causes the electrical/hydraulic transducing valve to generate the pressure oil signal, and thereby allows actuation of the communication valve to communicate the two inlet ports of the hydraulic motor such that the braking torque generated in the hydraulic motor becomes minimal, and that most of the inertia energy of the upper revolving structure is intensively supplied to the electric motor functioning as a power generator." To be more specific, in the Patent Document 1, when the operator returns the lever of the control valve to the neutral position, the control unit detects the change of the signal generated from the hydraulic/electric transducer, causing the regenerative operation.

The Patent Document 2 recites in the paragraph 0059: "The reference numeral ET2 shows that in the acceleration drive mode, an electric energy is supplied from the electric storage device to the power generator/electric motor. The reference numeral ET2 shows that in the deceleration drive mode, an electric energy is supplied from the power generator/electric motor to the electric storage device. The reference numerals xa, xd show the transition of the torque Tm in the acceleration drive and deceleration drive modes of the hydraulic motor. The reference numerals ya, yb show the transition of the torques Te(motor) and Te(generator) in the acceleration drive and deceleration drive modes of the power generator/electric motor." In sum, "in the deceleration drive mode, an electric energy is supplied from the power generator/electric motor to the electric storage device", which means the regenerative operation.

Further, the Patent Document 3 describes an energy regenerative device for a hydraulic construction machine mounting an electric motor/power generator, wherein the value of the manipulated variable of the control lever is used to determine whether to actuate the electric motor/power generator as an electric motor or as a power generator.

PRIOR ART REFERENCES

Patent Document 1: Japanese Laid-open Patent Publication No. 2008-291522
Patent Document 2: Japanese Patent No. 4732284
Patent Document 3: Japanese Patent No. 4024120

SUMMARY OF THE INVENTION

Problem to be Solved by the Invention

According to the Patent Document 1, "When the operator returns the lever 48a of the control valve 48 in order to stop the upper structure 2, the control unit 46 detects the change of the signal from the hydraulic/electric transducer 50a/50b, and a control signal S1 generated in accordance with the data processing program of the control unit is transmitted to the servo driver 54". This means that it is the position of the lever of the control valve that determines whether to regenerate or not.

According to the Patent Document 2, in a construction machine having an electric motor/power generator, it is the magnitude of the pressures at the two ports of a hydraulic motor that determines whether the electric motor/power generator functions as an electric motor or as a power generator.

Further, the Patent Document 3 describes that the manipulated variable of the control lever determines whether the electric motor/power generator functions as an electric motor or as a power generator.

In actuality, however, the regenerative condition sometimes cannot be produced only by the position of the control lever.

For example, the upper revolving structure that is driven by the electric motor/power generator, and the control lever that controls the upper revolving structure of the hydraulic construction machine are now considered. In this case, when the rotation direction of the upper revolving structure is identical with the operating direction of the control lever, the hydraulic construction machine is in the drive mode, and when the rotation direction of the upper revolving structure is opposite to the operating direction of the control lever, the hydraulic construction machine is in the deceleration mode. It is thus apparent that the parameter for determination of the drive/deceleration mode consists of the parameter of the rotation direction of the upper revolving structure and that of the operating direction of the control lever. However, none of the Patent Documents sufficiently disclose the method of controlling the regenerating condition in light of these parameters.

In comparison of the target revolution velocity of the upper revolving structure by way of the operation of the control lever with the actual revolution velocity of the upper revolving structure, there are cases where either one of the target revolution velocity and the actual revolution velocity is greater than the other, and where both of the velocity s are identical.

Further driving is required when the target revolution velocity is greater than the actual revolution velocity. In contrast, when the target revolution velocity is smaller than the actual revolution velocity, deceleration is required. Hence, energy can be regenerated when the target revolution velocity is smaller than the actual revolution velocity. However, none of the Patent Documents disclose the method of controlling the regenerating condition in light of the aforementioned parameters and in light of the relationship between the target revolution velocity and the actual revolution velocity.

Accordingly, an object of the present invention is a construction machine with a hybrid drive unit for driving a upper revolving structure of a construction machine device such as a hydraulic excavator, and a regenerative device provided with the construction machine, and a regenerative method, wherein the construction machine is controlled by way of the coordination of a hydraulic motor and a power-generation/electric motor, and wherein upon activation and revolving motion of the upper revolving structure, when in a brake mode, the hydraulic motor is neutralized by the internal communication of an inlet port and an outlet port of the hydraulic motor via a communication valve, such that most of the kinetic (inertia) energy is efficiently transduced into electric energy by way of regenerative power generation for electric storage, and such that the switchover between driving and regenerative power generation is rendered in the optimal condition.

Means of Solving Problems

In order to solve the aforementioned problem, the construction machine according to the present invention is a construction machine having an upper revolving structure with a plurality of inertia objects each corresponding to each predetermined function, and a lower traveling body, the upper revolving structure comprising: a hybrid drive unit; a plurality of hydraulic actuators that drive each of the plurality of inertia objects; a hydraulic pump that supplies pressure oil to the plurality of hydraulic actuators; an engine that drives the hydraulic pump; a controller that enters the operational intention of an operator; a directional control valve unit that supplies the pressure oil supplied from the hydraulic pump to each of the hydraulic actuators in response to a pressure oil signal generated from the controller; an electric motor/power generator that drives the upper revolving structure either in cooperation with at least a corresponding one of the plurality of hydraulic actuators or independent of the plurality of hydraulic actuators; a servo driver that drives the electric motor/power generator; an electrostatic capacitor that supplies/receives electrical power to/from the servo driver; a control unit that directs the generated torque to the servo driver in response to the pressure oil signal generated from the controller, and that switches over the control mode either to the power supply mode or to the regenerative power generation mode to direct the servo driver in accordance with the control mode, wherein the control unit determines the control mode of the control unit in accordance with the rotation direction of the upper revolving structure, the operating direction of the controller, the actual rotational velocity of the upper revolving structure, and the manipulated variable of the controller.

The control unit further comprises: a rotation direction detector that is connected to the control unit to detect a rotation direction of the upper revolving structure; an operating direction detector that is connected to the control unit to detect an operating direction of the controller; an actual rotational velocity detector that is connected to the control unit to detect an actual rotational velocity of the upper revolving structure; and a manipulated variable detector that is connected to the control unit to detect a manipulated variable of the controller.

The control mode comprises: a power supply mode in which power is supplied to the electric motor/power generator such that a torque is generated in the operating direction of the controller; a regenerative power generation mode in which power supply to the electric motor/power generator is discontinued and in which power is supplied from the electric motor/power generator to the electrostatic capacitor; and a zero mode in which power supply to the electric motor/power generator is discontinued.

The regenerative device according to the present invention is a regenerative device that is equipped in a construction machine having an upper revolving structure with a plurality of inertia objects each corresponding to each predetermined function, and a lower traveling body, the upper revolving structure comprising: a hybrid drive unit; a plurality of hydraulic actuators that drive each of the plurality of inertia objects; a hydraulic pump that supplies pressure oil to the plurality of hydraulic actuators; an engine that drives the hydraulic pump; a controller that enters the operational intention of an operator; a directional control valve unit that supplies the pressure oil supplied from the hydraulic pump to each of the hydraulic actuators in response to a pressure oil signal generated from the controller; an electric motor/power generator that drives the upper revolving structure either in cooperation with at least a corresponding one of the plurality of hydraulic actuators or independent of the plurality of hydraulic actuators; a servo driver that drives the electric motor/power generator; an electrostatic capacitor that supplies/receives electrical power to/from the servo driver; a control unit that directs the generated torque to the servo driver in response to the pressure oil signal generated from the controller, and that switches over the control mode either to the power supply mode or to the regenerative power generation mode to direct the servo driver in accordance with the control mode, wherein the control unit determines the control mode of the control unit in accordance with the rotation direction of the upper revolving structure, the operating direction of the controller, the actual rotational velocity of the upper revolving structure, and the manipulated variable of the controller.

Further, the regenerative method according to the present invention is a regenerative method by use of a regenerative device that is equipped in a construction machine having an upper revolving structure with a plurality of inertia objects each corresponding to each predetermined function, and a lower traveling body, the upper revolving structure comprising: a hybrid drive unit; a plurality of hydraulic actuators that drive each of the plurality of inertia objects; a hydraulic pump that supplies pressure oil to the plurality of hydraulic actuators; an engine that drives the hydraulic pump; a controller that enters the operational intention of an operator; a directional control valve unit that supplies the pressure oil supplied from the hydraulic pump to each of the hydraulic actuators in response to a pressure oil signal generated from the controller; an electric motor/power generator that drives the upper revolving structure either in cooperation with at least a corresponding one of the plurality of hydraulic actuators or independent of the plurality of hydraulic actuators; a servo driver that drives the electric motor/power generator; an electrostatic capacitor that supplies/receives electrical power to/from the servo driver; a control unit that directs the generated torque to the servo driver in response to the pressure oil signal generated from the controller, and that switches over the control mode either to the power supply mode or to the regenerative power generation mode to direct the servo driver in accordance with the control mode, wherein the control unit determines the control mode of the control unit in accordance with the rotation direction of the upper revolving structure, the operating direction of the controller, the actual rotational velocity of the upper revolving structure, and the manipulated variable of the controller.

Advantageous Effect of the Invention

The construction machine according to the present invention is a construction machine having an upper revolving structure with a plurality of inertia objects each corresponding to each predetermined function, and a lower traveling body, the upper revolving structure comprising: a hybrid drive unit; a plurality of hydraulic actuators that drive each of the plurality of inertia objects; a hydraulic pump that supplies pressure oil to the plurality of hydraulic actuators; an engine that drives the hydraulic pump; a directional control valve unit that supplies the pressure oil supplied from the hydraulic pump to each of the hydraulic actuators in response to a pressure oil signal generated from a controller; an electric motor/power generator that drives the upper revolving structure in cooperation with at least a corresponding one of the plurality of hydraulic actuators or independent of the plurality of hydraulic actuators; a driving force synthesis mechanism that synthesizes a driving force of the hydraulic actuator with a driving force of the electric motor/power generator; a servo driver that drives the electric motor/power generator; an electrostatic capacitor that supplies/receives electrical power to/from the servo driver; a control unit that directs the generated torque to the servo driver in response to the pressure oil signal generated from the control valve, and that switches over the control mode either to the power supply mode or to the regenerative power generation mode to direct the servo driver in accordance with the control mode; and a consumption energy curtailment means that curtails the inertia energy to be consumed by the hydraulic actuator during braking of the upper revolving structure, the inertia energy being among the one acquired by the upper revolving structure when the electric motor/power generator is activated, wherein the control unit determines the control mode of the control unit in accordance with the rotation direction of the hydraulic actuator, the operating direction of the hydraulic actuator controller, the actual rotational velocity of the hydraulic actuator, and the manipulated variable of the hydraulic actuator controller, whereby the hydraulic motor is neutralized, such that most of the kinetic (inertia) energy is efficiently transduced into electric energy by way of regenerative power generation for electric storage, and such that the switchover between driving and regenerative power generation can be rendered in the optimal condition.

EMBODIMENTS

Now, the configuration of the hybrid revolution drive unit that rotates and drives the upper revolving structure equipped with the regenerative device according to the present invention will be described with reference to FIG. 1.

Figure 1:
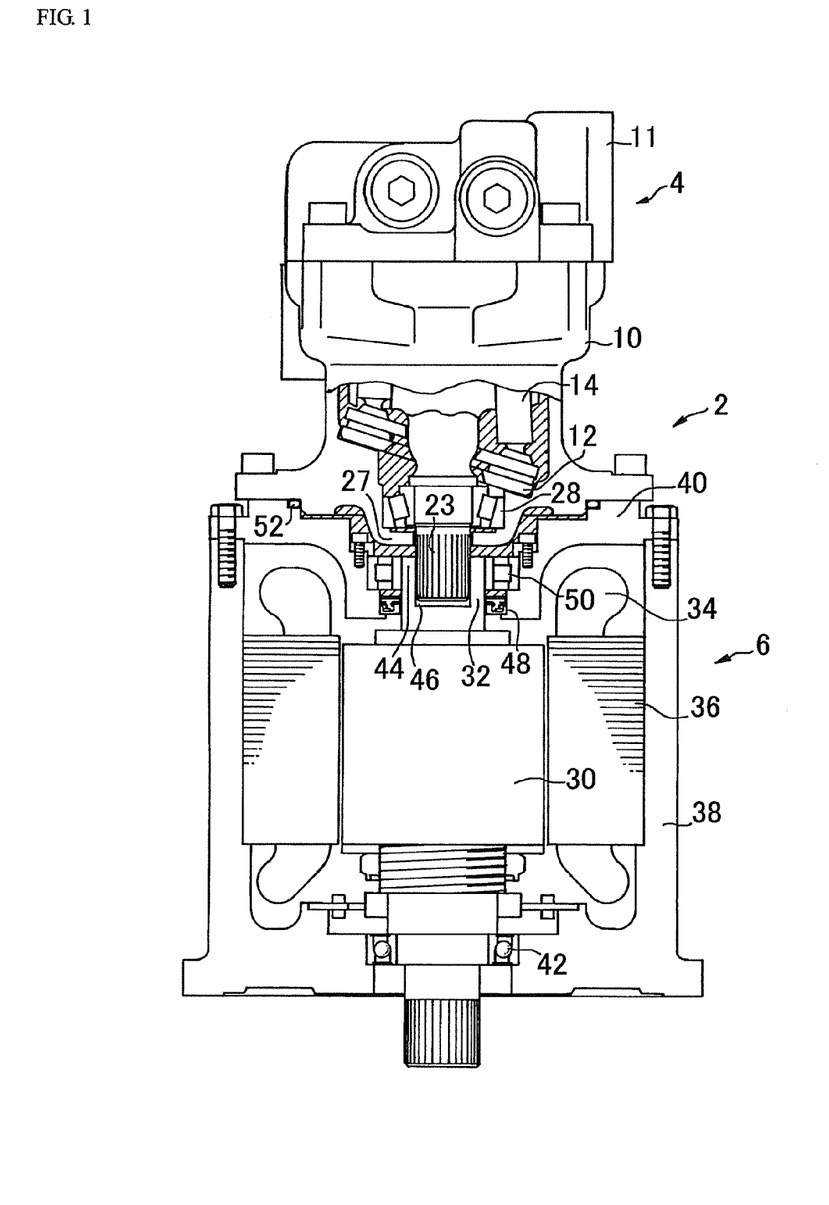
FIG. 1 is a front overview diagram of the hybrid revolution drive unit that rotates and drives the upper revolving structure equipped with the regenerative device according to the present invention.

FIG. 1 is a cross-sectional view showing the internal configuration of the electric hydraulic hybrid motor 2 according to the first embodiment of the present invention. In this drawing, the hydraulic motor 4 and the electric motor 6 are coaxially connected.

The hydraulic motor 4 comprises a hydraulic motor housing 10 that is opened at the rear end thereof and has a tubular shape, and a housing cover 11 that blocks in the rear end opening of the hydraulic motor housing 10. The hydraulic motor housing 10 comprises therein a skew plate 12, a piston 14, a hydraulic motor shaft 23 integrated with a cylinder block. The hydraulic motor shaft 23 extends through the central borehole of the skew plate 12, and is rotatably supported, via a bearing 28, by a boss section 27 formed at the front end of the hydraulic motor housing 10. The boss section 27 of the hydraulic motor 4 is not provided with an oil seal.

The electric motor 6 comprises a rotor 30, an electric motor shaft 32 mounted in the rotor 30, a stator core 36 arranged facing the outer circumference side of the rotor 30, a coil 34 mounted on the stator core 36, an electric motor housing 38 that accommodates these parts, and an end cover 40.

The electric motor shaft 32 according to the present embodiment extends through the substantially central region of the rotor 30 and is locked. In FIG. 1, the electric motor shaft 32 is rotatably supported by the bearing 42 at the bottom end of the electric motor shaft 32.

On the other hand, the hydraulic motor side end 44 of the electric motor shaft 32 is provided with a concave recess 46, and the hydraulic motor shaft 23 is disposed within the recess 46 and is fixed, and the hydraulic motor shaft 23 and the electric motor shaft 32 are rotatably locked to each other in conjunction.

Further, an electric motor oil seal 48 is mounted between the hydraulic motor side end 44 and the end cover 40.

An electric motor bearing 50 is arranged adjacent to the electric motor oil seal 48, and the hydraulic motor side end 44 is rotatably locked between the end cover 40 and the electric motor bearing 50.

The hydraulic motor housing 10 and the end cover 40 are sealed by an O ring 52 and are coupled in a liquid-tight manner.

According to the above-described configuration, the hydraulic motor 4 is combined with the electric motor 6, and in particular, the electric motor oil seal 48 is provided on the end cover 40 of the electric motor 6, such that the electric motor oil seal 48 is not arranged on the hydraulic motor 4 side, but rather the hydraulic motor 4 and the electric motor bearing 50 are arranged in the hydraulic actuation oil. Hence, there is an advantage that the pressure oil circulates between the electric motor bearing 50 and the end cover 40, and that thereby it will no longer be necessary to exchange the lubricant in the region adjacent to the electric motor bearing 50.

Further, since the recess 46 is provided on the electric motor shaft 32, the longitudinal length of the hydraulic motor shaft 23 and the electric motor shaft 32 when coupled in series will be shortened.

Figure 2:
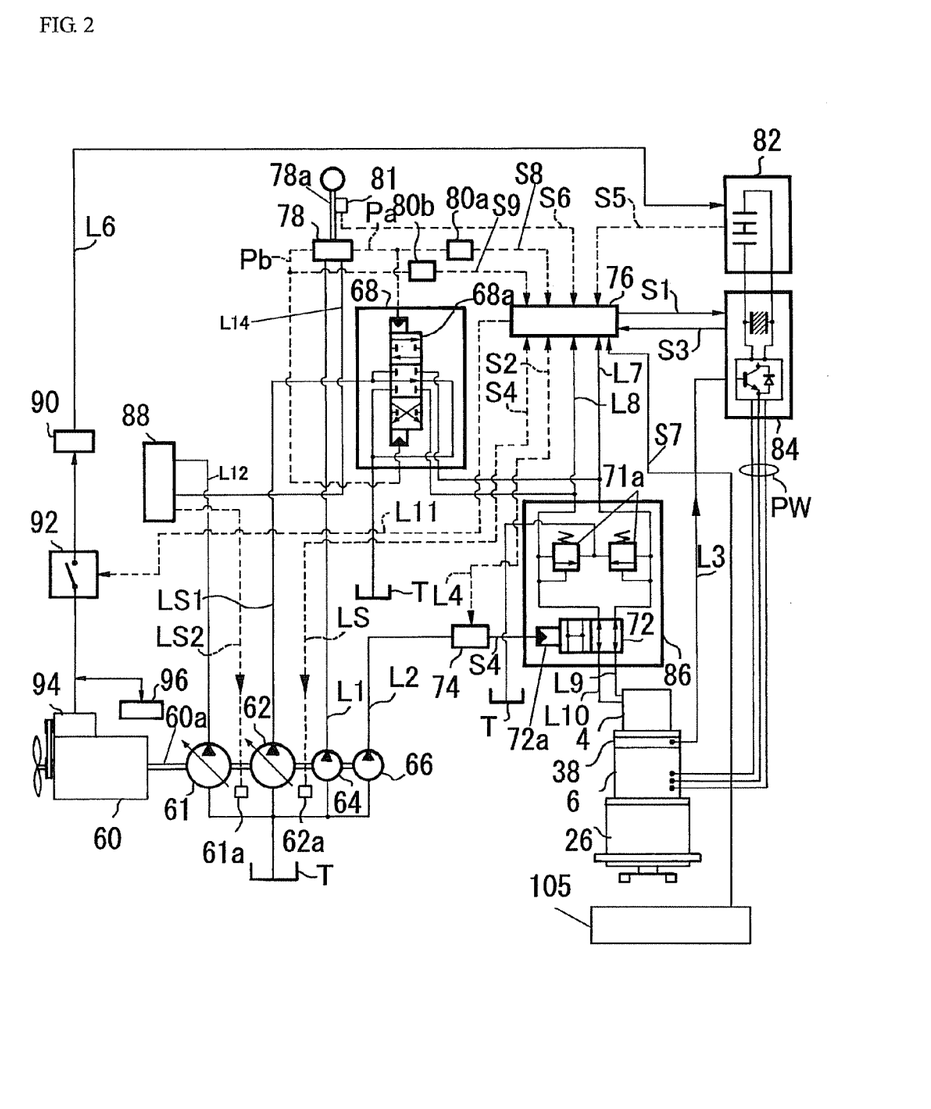
FIG. 2 is a control block diagram of the regenerative device according to the present invention.

Next, the control block of the regenerative device according to the present invention will be described with reference to FIG. 2.

A rotation output shaft 60a of the engine 60 is configured such that the rotatable shaft of the variable capacity pump 62 and the rotatable shafts of the stationary capacity gear pumps 64, 66 are integrally arranged to form a main variable capacity pump 61, and thereby the engine 60 rotary-drives the pumps 62, 64, 66, 61. The variable capacity pump 62 is provided, in particular, as a revolution variable capacity pump.

The reference numeral 68 represents a revolution directional control valve unit that supplies/drains the pressure oil between the variable capacity pump 62 and each hydraulic actuator of the hydraulic excavator or the tank via a discharge line LS1, wherein the revolution directional control valve unit 68 comprises a center bypass-type directional control valve 68a that corresponds to the revolution hydraulic motor 4 for revolvably driving the upper revolving structure 104.

The reference numeral 78 represents a control valve for generating the operating pressure signals Pa, Pb through operation of the lever 78a by the operator of the construction machine. Predetermined-pressured pressure oil is supplied from the gear pump 64 to the control valve 78 via the line L1. The operating pressure signals Pa, Pb are transduced into electric signals by the hydraulic/electric transducers 80a, 80b, and are fed to the control unit 76 as signals S8, S9. A push switch 81 is embedded in the lever 78a, and a control signal S6 is fed to the control unit 76.

The hydraulic/electric transducer 80a, 80b comprises either a foil strain gauge pressure transducing device or a semiconductor strain gauge pressure transducing device (Silicon-on-Sapphire sensor).

The reference numeral 86 represents a hydraulic motor control unit comprising a pair of relief valve 71a and a communication valve 72. As illustrated, the communication valve 72 is connected to each cylinder port of the switchover control valve 68a via pressure oil supply/drainage lines L7, L8. On the other hand, the communication valve 72 is also connected to the revolution hydraulic motor 4 via lines L9, L10.

To a pressured unit 72a of the communication valve 72 is fed a control signal S4 generated from the electric/hydraulic transducing valve 74. Predetermined-pressured pressure oil is fed from the pump 66 via the line L2 to the electric/hydraulic transducing valve 74, and the electric/hydraulic transducing valve 74 is fed via a line L4 a control signal S2 generated from the control unit 76. A branch line that detects the pressure of the lines L7, L8 is connected to the control unit 76, and the pressure of the branch line is transduced into an electric signal by a hydraulic/electric transducer (not shown).

The reference numeral 82 represents an electrostatic capacitor that is connected to a power supply line of the servo driver 84 that supplies electrical power to a three-phase electric motor/power generator 6. As shown schematically, the servo driver 84 has the function of supplying electrical power to the electric motor/power generator 6 via each phase winding PW such that the electric motor/power generator 6 generates predetermined torque in the output shaft 6a via each phase winding PW, as well as the function of regenerating electrical power to the servo driver 84 via each phase winding PW when the torque given to the output shaft 6a from the inertia object of the upper revolving structure 104 causes the electric motor/power generator 6 to work as a regenerative generator.

The destination of the main variable capacity pump 61 is the main directional control valve unit 88. The discharge capacity regulating mechanism 61a that regulates the main directional control valve unit 88 is connected to the main directional control valve unit 88 via the signal line LS2.

The main directional control valve unit 88 is connected to the main variable capacity pump 61 via a discharge line L12. The main directional control valve unit 88 is further connected to the control valve 78 via a line L14.

The control unit 76 is connected to the electrostatic capacitor 82 such that the control signal S5 generated from the electrostatic capacitor 82 is fed to the control unit 76, and the control unit 76 is further connected to the push switch 81 such that the control signal S6 generated from the push switch 81 is fed to the control unit 76. The signal L11 generated from the control unit 76 is fed to the switch 92 that is arranged between the starter 94 connected to the engine 60 and the converter/inverter 90. The control unit 76 feeds S4 (signal LS) to the discharge capacity regulating mechanism 62a of the revolution variable capacity pump 62. The signal S7 generated from the detector 105 that detects the rotation direction and the rotational velocity of the upper revolving structure 104 is fed to the control unit 76.

More specifically, the control unit 76 comprises a central processing unit 76a, a program storage memory device 76b, a data storage memory device 76c, an external interface 76d, and an internal bus wiring 76e connecting these components 76a, 76b, 76c and 76d (not shown). The program storage memory device 76b stores a rotation direction status calculation program, a lever operating direction status calculation program, a velocity difference status calculation program, and a control mode determination program. The program storage memory device 76b further stores the status transition diagram STD. The function of each program will be described hereinafter.

Figure 4:
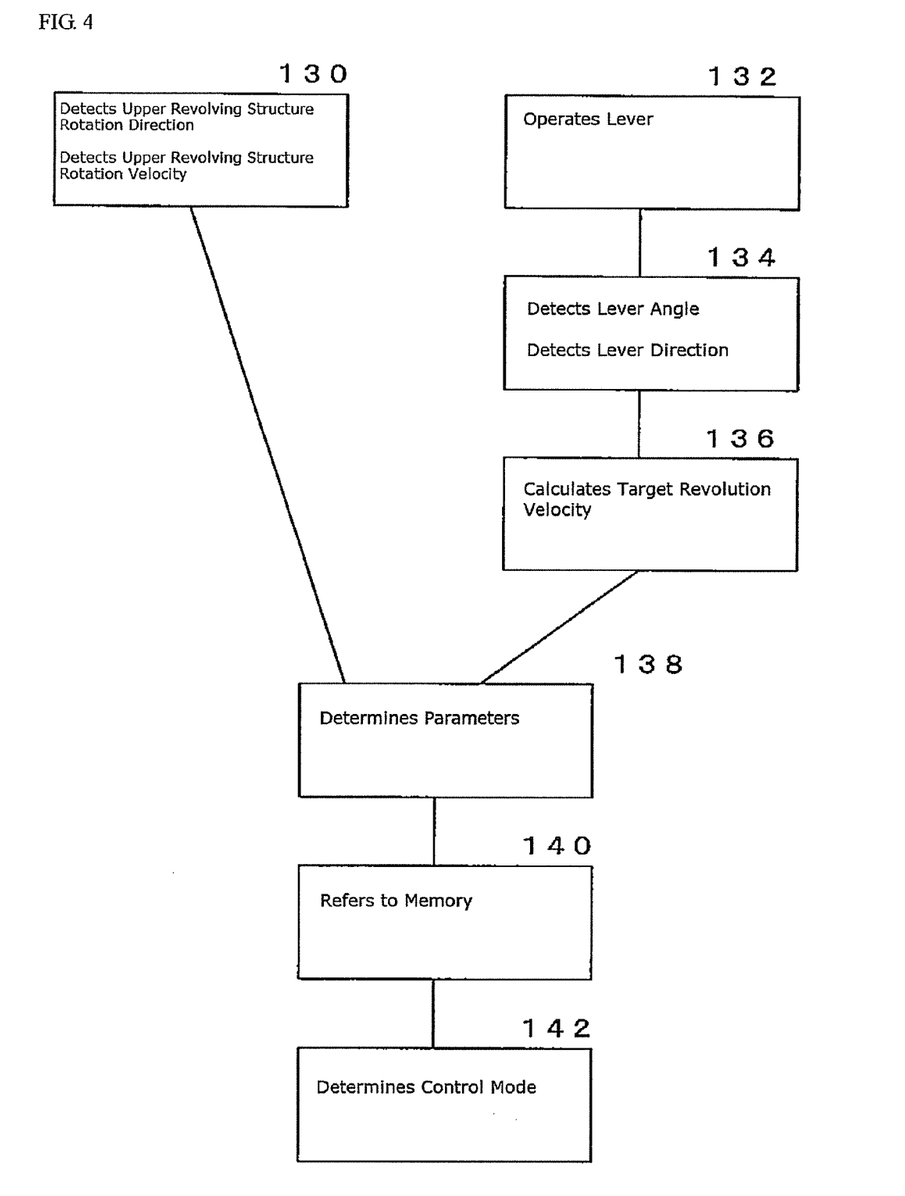
FIG. 4 is a control mode determination flowchart of the regenerative device according to the present invention.

Now, the operation of the regenerative device according to the present invention will be described with reference to the control mode determination flowchart shown in FIG. 4.

The detector 105 always detects the upper revolving structure rotation direction DRS and the upper revolving structure rotation velocity VRS (130). According to the rotation direction status calculation program, the central processing unit 76a stores in the data storage memory device 76c the upper revolving structure rotation direction DRS and the upper revolving structure rotation velocity VRS that are data generated from the detector 105.

The operator operates the lever 78a to generate the operating pressure signals Pa, Pb (132).

The operating pressure signals Pa, Pb are transduced into electric signals S8, S9 by the hydraulic/electric transducers 80a, 80b, and the control unit 76 refers to the signal difference between the signals S8, S9 to detect the lever angle DEGL which is the manipulated variable of the lever 78a and the lever direction DERL (134). According to the lever operating direction status calculation program, the central processing unit 76a refers to the signal difference between the signals S8, S9, and detects the lever angle DEGL which is the manipulated variable of the lever 78a and the lever direction DERL, and stores the detected results in the data storage memory device 76c.

The signals S8, S9 are fed to the control unit 76 as voltage values ranging from 1 to 5 volts depending on the lever control angle, and the lever angle DEGL is configured to be obtained from the correlation between the aforementioned voltage value and the lever control angle. As a specific example, the voltage value ranging from 1 to 5 volts is configured to correspond to the angular range of 0 to 90 degrees.

When it comes to the lever direction DERL, if the value of the signal difference is defined as "S8-S9", each of the signals S8, S9 is fed as a voltage value within the range from 1 to 5 volts, resulting in the lever direction DERL having the following values. The lever is in the neutral status when S8−S9=1−1=0 (hereinafter "zero"). Control of the lever toward S8 leads to S8−S9=S8−1>0 (hereinafter "positive"). Control of the lever toward S9 leads to S8−S9=1<S9<0 (hereinafter "negative"). Accordingly, the central processing unit 76a determines that the positive signal difference is the S8 side lever control and that the negative signal difference is the S9 side lever control.

Figure 5:
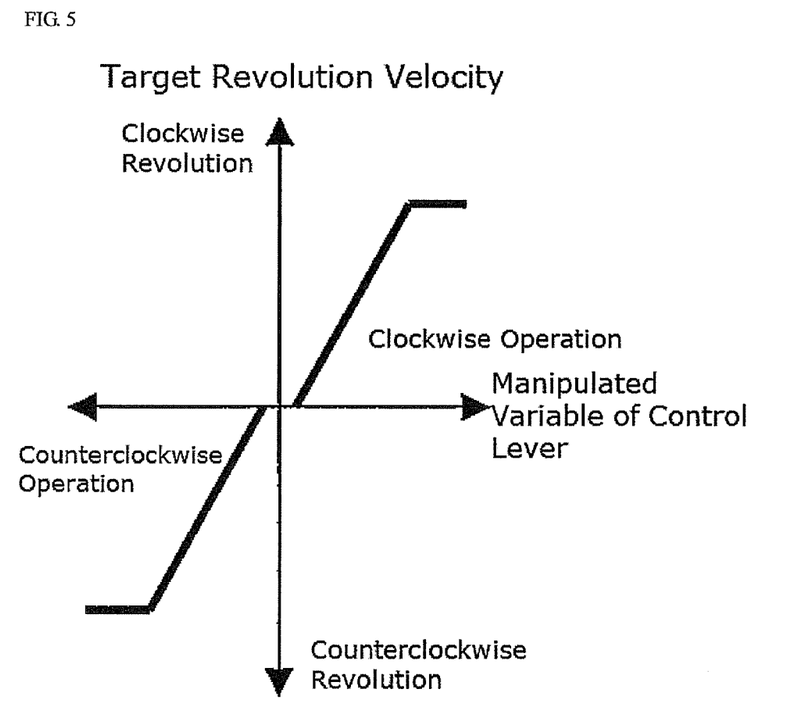
FIG. 5 is an explanatory diagram showing the relationship between the manipulated variable of the upper revolving structure control lever and the target revolution velocity of the upper revolving structure in the regenerative device according to the present invention.

The control unit 76 calculates the target revolution velocity VO with reference to the relationship between the lever manipulated variable and the target revolution velocity shown in FIG. 5 (136). According to the lever operating direction status calculation program, the central processing unit 76a calculates the target revolution velocity VO with reference to the relationship between the lever manipulated variable and the target revolution velocity shown in FIG. 5, and stores the calculated results in the data storage memory device 76c.

A small angle operation of the lever 78a causes a play thereof, and the target revolution velocity VO is zero. As the right-direction manipulated variable of the lever 78a increases in excess of the play thereof, the target revolution velocity VO increases in the right revolution direction in proportion to the lever manipulated variable. However, when the operational angle of the lever 78a is in excess of the predetermined angle, the target revolution velocity VO stays constant and will not increase anymore.

The same applies to the left-direction manipulated variable of the lever 78a. A small angle operation of the lever 78a causes a play thereof, and the target revolution velocity VO is zero. As the left-direction manipulated variable of the lever 78a increases in excess of the play thereof, the target revolution velocity VO increases in the left revolution direction in proportion to the lever manipulated variable. However, when the operational angle of the lever 78a is in excess of the predetermined angle, the target revolution velocity VO stays constant and will not increase anymore.

Then, the control unit 76 calculates the rotation direction status ROS based on the upper revolving structure rotation direction DRS to determine whether the ROS is any one of the right, left and stop statuses.

The "right" status is defined as when the upper revolving structure 104 is caused to revolve clockwise relative to the lower traveling body 102 as viewed from above.

On the contrary, the "left" status is defined as when the upper revolving structure 104 is caused to revolve counterclockwise relative to the lower traveling body 102 as viewed from above.

The "stop" status is defined as when the upper revolving structure 104 is not caused to revolve but is caused to stop relative to the lower traveling body 102 as viewed from above.

The control unit 76 calculates the lever operating direction status DIRS based on the lever direction DERL to determine whether the DIRS is any one of the right, left and stop statuses.

The "right" status is defined as when operation of the lever 78a causes the upper revolving structure 104 to revolve clockwise relative to the lower traveling body 102 as viewed from above.

The "left" status is defined as when operation of the lever 78a causes the upper revolving structure 104 to revolve counterclockwise relative to the lower traveling body 102 as viewed from above.

The "stop" status is defined as when the lever 78a is not operated.

Then, it is determined whether the velocity difference status DEFY is any one of the positive, negative and zero statuses. The velocity difference status DEFY is based on whether the value deducting the absolute value of the upper revolving structure rotation velocity VRS from the absolute value of the target revolution velocity VO is positive or negative. According to the velocity difference status calculation program, the central processing unit 76a calculates the velocity difference status DEFY from the upper revolving structure rotation velocity VRS and the target revolution velocity VO, and stores the calculated results in the data storage memory device 76c.

The "positive" status of the velocity difference status DEFY is defined as when the absolute value of the target revolution velocity VO corresponding to the manipulated variable of the lever 78a is greater than that of the upper revolving structure rotation velocity VRS which represents the actual revolution velocity of the upper revolving structure.

The "negative" status of the velocity difference status DEFV is defined as when the absolute value of the upper revolving structure rotation velocity VRS is greater than that of the target revolution velocity VO.

The "zero" status of the velocity difference status DEFY is defined as when the absolute value of the target revolution velocity VO is equal to the absolute value of the upper revolving structure rotation velocity VRS.

In the aforementioned manner, the control unit 76 determines the rotation direction status ROS, the lever operating direction status DIRS, and the velocity difference status DEFV (138).

Figure 7:
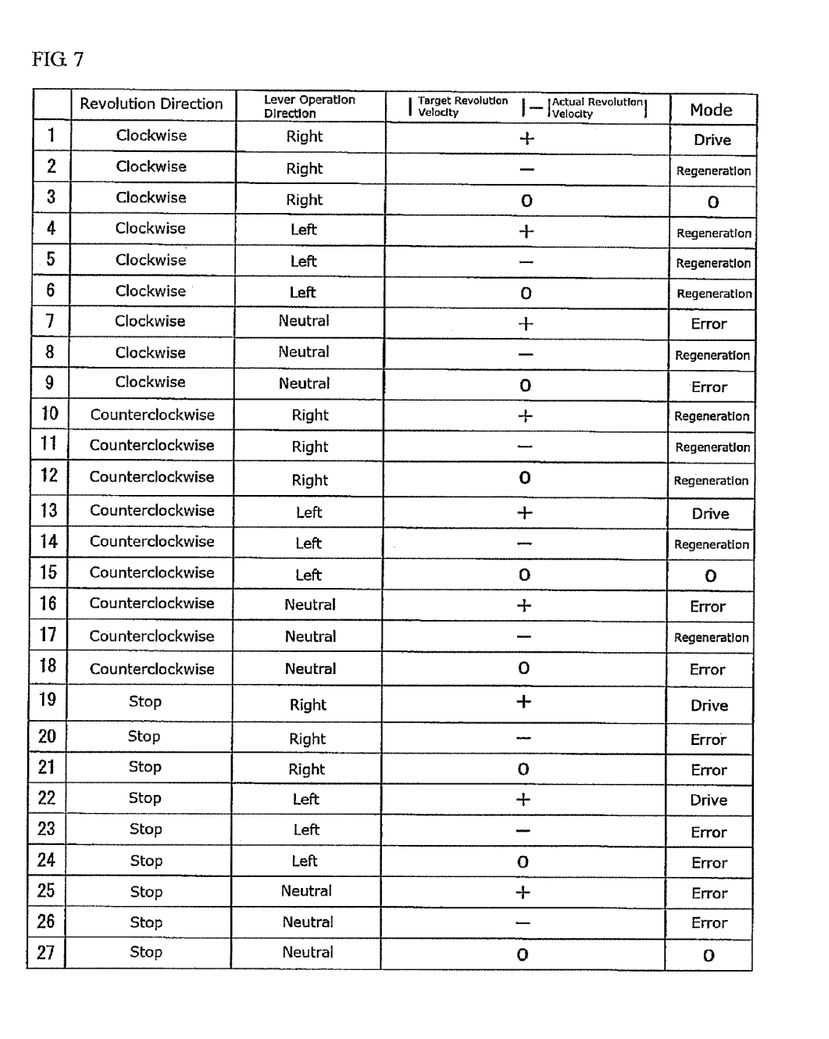
FIG. 7 is a correspondence table listing all possible status combinations and all of the control modes corresponding thereto in light of the rotation direction, the lever operating direction, and the positive/neutral/negative statuses when comparing the target revolution velocity with the actual revolution velocity, of the upper revolving structure of the construction machine having the regenerative device according to the present invention.

The control unit 76 refers to the status transition diagram STD that is stored in the memory built therein and that is shown in FIG. 7. Seeing the status transition diagram STD, the leftmost column represents the status serial numbers, the second column represents the rotation direction status ROS, the third column represents the lever operating direction status DIRS, the fourth column represents the velocity difference status DEFV, and the fifth column represents the control mode. The diagram describes 27 patterns of the combination of each status.

The control mode can take four patterns, i.e. the supply electrical power supply mode in which electrical power is supplied, the regenerative power generation mode, the zero mode, and the error mode. In FIG. 7, the electrical power supply mode corresponds to the "drive" mode, the regenerative power generation mode corresponds to the "regeneration" mode, and the "zero" mode is a status in which the electric motor/power generator does not generate torque or conducts electrical power supply or regenerative power generation. Since it is likely that errors at the time of mode determination are caused by sensor abnormality, the "error" mode is not affected by any components except the sensor. When this "error" mode occurs, braking is done by the hydraulic motor to stop the upper revolving structure. In this case, the motor is neutralized and the torque becomes zero (Nm).

The control unit 76 makes referral to the data of the status transition diagram STD stored in the memory to inquire the status corresponding to the parameters determined in the aforementioned steps (140). The control unit 76 reads the current control mode from the recorded status transition diagram STD. To be more specific, according to the control mode determination program, the central processing unit 76a reads the control mode that corresponds to the current combination of each of the statuses from the status transition diagram STD, and stores the read results in the data storage memory device 76c.

After reading the current control mode from the status transition diagram STD, the control unit 76 determines the control mode (142).

Figure 6:
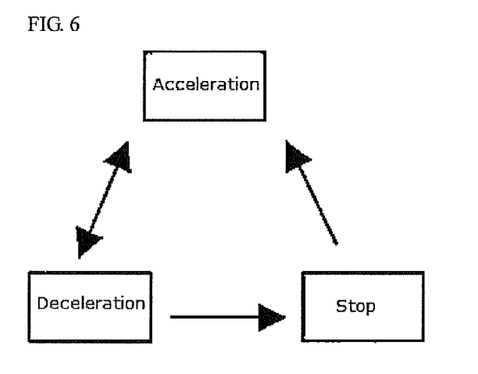
FIG. 6 is a status transition diagram of the control modes of regenerative device according to the present invention.

As shown in FIG. 6, the control mode after stopping will inevitably be acceleration. The control mode after acceleration is nothing other than deceleration. The control mode after deceleration can be both acceleration and stopping.

Operation of the control unit 76 in the aforementioned manner allows the control unit 76 to conduct the regeneration operation that better matches the intention of the operator and the status of the construction machine operated.

The preferred embodiments of the present invention have been described above with reference to the drawings, and the skilled person can naturally make a variety of modifications based on the aforementioned drawings and description.

EXPLANATION OF LETTERS OR NUMERALS 2 electric hydraulic hybrid motor
4 hydraulic motor
6 electric motor
6a output shaft
10 hydraulic motor housing
11 housing cover
12 skew plate
14 piston
23 hydraulic motor shaft
27 boss section
28 bearing
30 rotor
32 electric motor shaft
34 coil
36 stator core
38 electric motor housing
40 end cover
42 bearing
44 hydraulic motor side end
46 recess
48 electric motor oil seal
50 electric motor bearing
52 O ring
60 engine
60a rotation output shaft
61 main variable capacity pump
61a discharge capacity regulating mechanism
62 revolution variable capacity pump
62a discharge capacity regulating mechanism
64, 66 gear pump
68 directional control valve
68a directional control valve
71a relief valve
72 communication valve
72a pressured unit
74 electric/hydraulic transducing valve
76 control unit
78 control valve
78a lever
80a, 80b hydraulic/electric transducer
81 push switch
82 electrostatic capacitor
84 servo driver
86 hydraulic motor control unit
88 main directional control valve unit
90 converter/inverter
92 switch
94 starter
102 lower traveling body
104 upper revolving structure
105 detector

The invention claimed is:

1. A construction machine having an upper revolving structure with a plurality of inertia objects each corresponding to each predetermined function, and a lower traveling body, the upper revolving structure comprising:

a hybrid drive unit;
a plurality of hydraulic actuators that drive each of the plurality of inertia objects;
a hydraulic pump that supplies pressure oil to the plurality of hydraulic actuators;
an engine that drives the hydraulic pump;
a controller that enters the operational intention of an operator;
a directional control valve unit that supplies the pressure oil supplied from the hydraulic pump to each of the hydraulic actuators in response to a pressure oil signal generated from the controller;
an electric motor/power generator that drives the upper revolving structure either in cooperation with at least a corresponding one of the plurality of hydraulic actuators or independent of the plurality of hydraulic actuators;
a servo driver that drives the electric motor/power generator;
an electrostatic capacitor that supplies/receives electrical power to/from the servo driver; and
a control unit that directs the generated torque to the servo driver in response to the pressure oil signal generated from the controller, and that switches over the control mode either to the power supply mode or to the regenerative power generation mode to direct the servo driver in accordance with the control mode, wherein the control unit determines the control mode of the control unit in accordance with the rotation direction of the upper revolving structure, the operating direction of the controller, the actual rotational velocity of the upper revolving structure, and the manipulated variable of the controller.

2. The construction machine as claimed in claim 1, wherein the control unit further comprises:
   a rotation direction detector that is connected to the control unit to detect a rotation direction of the upper revolving structure;
   an operating direction detector that is connected to the control unit to detect an operating direction of the controller;
   an actual rotational velocity detector that is connected to the control unit to detect an actual rotational velocity of the upper revolving structure; and
   a manipulated variable detector that is connected to the control unit to detect a manipulated variable of the controller.

3. A construction machine as claimed in claim 1, wherein the control mode comprises:
   a power supply mode in which power is supplied to the electric motor/power generator such that a torque is generated in the operating direction of the controller;
   a regenerative power generation mode in which power supply to the electric motor/power generator is discontinued and in which power is supplied from the electric motor/power generator to the electrostatic capacitor; and
   a zero mode in which power supply to the electric motor/power generator is discontinued.

4. A regenerative device that is equipped in a construction machine having an upper revolving structure with a plurality of inertia objects each corresponding to each predetermined function, and a lower traveling body, the upper revolving structure comprising:
   a hybrid drive unit;
   a plurality of hydraulic actuators that drive each of the plurality of inertia objects;
   a hydraulic pump that supplies pressure oil to the plurality of hydraulic actuators;
   an engine that drives the hydraulic pump;
   a controller that enters the operational intention of an operator;
   a directional control valve unit that supplies the pressure oil supplied from the hydraulic pump to each of the hydraulic actuators in response to a pressure oil signal generated from the controller;
   an electric motor/power generator that drives the upper revolving structure either in cooperation with at least a corresponding one of the plurality of hydraulic actuators or independent of the plurality of hydraulic actuators;
   a servo driver that drives the electric motor/power generator;
   an electrostatic capacitor that supplies/receives electrical power to/from the servo driver;
   a control unit that directs the generated torque to the servo driver in response to the pressure oil signal generated from the controller, and that switches over the control mode either to the power supply mode or to the regenerative power generation mode to direct the servo driver in accordance with the control mode,
   wherein the control unit determines the control mode of the control unit in accordance with the rotation direction of the upper revolving structure, the operating direction of the controller, the actual rotational velocity of the upper revolving structure, and the manipulated variable of the controller.

5. A regenerative method by use of a regenerative device that is equipped in a construction machine having an upper revolving structure with a plurality of inertia objects each corresponding to each predetermined function, and a lower traveling body, the upper revolving structure comprising:
   a hybrid drive unit;
   a plurality of hydraulic actuators that drive each of the plurality of inertia objects;
   a hydraulic pump that supplies pressure oil to the plurality of hydraulic actuators;
   an engine that drives the hydraulic pump;
   a controller that enters the operational intention of an operator;
   a directional control valve unit that supplies the pressure oil supplied from the hydraulic pump to each of the hydraulic actuators in response to a signal generated from the controller;
   an electric motor/power generator that drives one of the inertia objects either in cooperation with at least a corresponding one of the plurality of hydraulic actuators or independent of the plurality of hydraulic actuators;
   a servo driver that drives the electric motor/power generator;
   an electrostatic capacitor that supplies/receives electrical power to/from the servo driver;
   a control unit that directs the generated torque to the servo driver in response to the pressure oil signal generated from the controller, and that switches over the control mode either to the power supply mode or to the regenerative power generation mode to direct the servo driver in accordance with the control mode,
   wherein the control unit determines the control mode of the control unit in accordance with the rotation direction of the upper revolving structure, the operating direction of the controller, the actual rotational velocity of the upper revolving structure, and the manipulated variable of the controller.

* * * * *